United States Patent
Avudaiyappan et al.

(10) Patent No.: US 9,720,839 B2
(45) Date of Patent: *Aug. 1, 2017

(54) SYSTEMS AND METHODS FOR SUPPORTING A PLURALITY OF LOAD AND STORE ACCESSES OF A CACHE

(71) Applicant: Intel Corporation, Santa Clara, CA (US)

(72) Inventors: Karthikeyan Avudaiyappan, Sunnyvale, CA (US); Mohammad Abdallah, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,035

(22) Filed: Oct. 23, 2015

(65) Prior Publication Data

US 2016/0041913 A1  Feb. 11, 2016

Related U.S. Application Data

(63) Continuation of application No. 13/561,570, filed on Jul. 30, 2012, now Pat. No. 9,229,873.

(51) Int. Cl.
| | |
|---|---|
| G06F 12/08 | (2016.01) |
| G06F 12/0846 | (2016.01) |
| G06F 12/0895 | (2016.01) |

(52) U.S. Cl.
CPC ...... *G06F 12/0846* (2013.01); *G06F 12/0848* (2013.01); *G06F 12/0895* (2013.01);
(Continued)

(58) Field of Classification Search
CPC .. G06F 12/08; G06F 12/0846; G06F 12/0895; G06F 12/0844; G06F 12/0848; G06F 2212/1021; G06F 2212/6082
See application file for complete search history.

(56) References Cited

U.S. PATENT DOCUMENTS

| | | |
|---|---|---|
| 4,075,704 A | 2/1978 | O'Leary |
| 4,245,344 A | 1/1981 | Richter |
| (Continued) | | |

FOREIGN PATENT DOCUMENTS

| | | |
|---|---|---|
| CN | 1305150 A | 7/2001 |
| EP | 0596636 | 5/1994 |
| (Continued) | | |

OTHER PUBLICATIONS

Barham et al., "Xen and the Art of Virtualization," ACM Symposium on Operating Systems Principles, Oct. 19, 2003, pp. 164-177.
(Continued)

*Primary Examiner* — Michael Krofcheck
(74) *Attorney, Agent, or Firm* — Nicholson De Vos Webster & Elliott LLP

(57) ABSTRACT

Systems and methods for supporting a plurality of load and store accesses of a cache are disclosed. Responsive to a request of a plurality of requests to access a block of a plurality of blocks of a load cache, the block of the load cache and a logically and physically paired block of a store coalescing cache are accessed in parallel. The data that is accessed from the block of the load cache is overwritten by the data that is accessed from the block of the store coalescing cache by merging on a per byte basis. Access is provided to the merged data.

18 Claims, 7 Drawing Sheets

(52) U.S. Cl.
CPC ............... *G06F 2212/1021* (2013.01); *G06F 2212/6082* (2013.01)

(56) References Cited

U.S. PATENT DOCUMENTS

| | | | |
|---|---|---|---|
| 4,356,550 A | 10/1982 | Katzman et al. | |
| 4,414,624 A | 11/1983 | Summer, Jr. et al. | |
| 4,524,415 A | 6/1985 | Mills, Jr. et al. | |
| 4,527,237 A | 7/1985 | Frieder et al. | |
| 4,577,273 A | 3/1986 | Hopper et al. | |
| 4,597,061 A | 6/1986 | Cline et al. | |
| 4,600,986 A | 7/1986 | Scheuneman et al. | |
| 4,633,434 A | 12/1986 | Scheuneman | |
| 4,682,281 A | 7/1987 | Woffinden et al. | |
| 4,816,991 A | 3/1989 | Watanabe et al. | |
| 4,920,477 A | 4/1990 | Colwell et al. | |
| 5,294,897 A | 3/1994 | Notani et al. | |
| 5,317,705 A | 5/1994 | Gannon et al. | |
| 5,317,754 A | 5/1994 | Blandy et al. | |
| 5,548,742 A | 8/1996 | Wang et al. | |
| 5,559,986 A | 9/1996 | Alpert et al. | |
| 5,574,878 A | 11/1996 | Onodera et al. | |
| 5,581,725 A | 12/1996 | Nakayama | |
| 5,634,068 A | 5/1997 | Nishtala et al. | |
| 5,752,260 A * | 5/1998 | Liu | G11C 15/04 |
| | | | 711/118 |
| 5,754,818 A | 5/1998 | Mohamed | |
| 5,787,494 A | 7/1998 | DeLano et al. | |
| 5,793,941 A | 8/1998 | Pencis et al. | |
| 5,802,602 A | 9/1998 | Rahman et al. | |
| 5,806,085 A | 9/1998 | Berliner | |
| 5,813,031 A | 9/1998 | Chou et al. | |
| 5,835,951 A | 11/1998 | McMahan | |
| 5,852,738 A | 12/1998 | Bealkowski et al. | |
| 5,860,146 A | 1/1999 | Vishin et al. | |
| 5,864,657 A | 1/1999 | Stiffler | |
| 5,872,985 A | 2/1999 | Kimura | |
| 5,881,277 A | 3/1999 | Bondi et al. | |
| 5,903,750 A | 5/1999 | Yeh et al. | |
| 5,905,509 A | 5/1999 | Jones et al. | |
| 5,918,251 A | 6/1999 | Yamada et al. | |
| 5,956,753 A | 9/1999 | Glew et al. | |
| 5,974,506 A | 10/1999 | Sicola et al. | |
| 6,016,533 A | 1/2000 | Tran | |
| 6,073,230 A | 6/2000 | Pickett et al. | |
| 6,075,938 A | 6/2000 | Bugnion et al. | |
| 6,088,780 A | 7/2000 | Yamada et al. | |
| 6,092,172 A | 7/2000 | Nishimoto et al. | |
| 6,101,577 A | 8/2000 | Tran | |
| 6,115,809 A | 9/2000 | Mattson, Jr. et al. | |
| 6,134,634 A | 10/2000 | Marshall, Jr. et al. | |
| 6,138,226 A | 10/2000 | Yoshioka et al. | |
| 6,157,998 A | 12/2000 | Rupley, II et al. | |
| 6,167,490 A | 12/2000 | Levy et al. | |
| 6,205,545 B1 | 3/2001 | Shah et al. | |
| 6,212,613 B1 | 4/2001 | Belair | |
| 6,226,732 B1 | 5/2001 | Pei et al. | |
| 6,247,097 B1 | 6/2001 | Sinharoy | |
| 6,253,316 B1 | 6/2001 | Tran et al. | |
| 6,256,727 B1 | 7/2001 | McDonald | |
| 6,256,728 B1 | 7/2001 | Witt et al. | |
| 6,260,131 B1 | 7/2001 | Kikuta et al. | |
| 6,260,138 B1 | 7/2001 | Harris | |
| 6,272,662 B1 * | 8/2001 | Jadav | G06F 3/0607 |
| | | | 714/770 |
| 6,275,917 B1 | 8/2001 | Okada | |
| 6,321,298 B1 | 11/2001 | Hubis | |
| 6,332,189 B1 | 12/2001 | Baweja et al. | |
| 6,341,324 B1 | 1/2002 | Caulk, Jr. et al. | |
| 6,437,789 B1 * | 8/2002 | Tidwell | G06F 12/0848 |
| | | | 345/531 |
| 6,449,671 B1 | 9/2002 | Patkar et al. | |
| 6,457,120 B1 | 9/2002 | Sinharoy | |
| 6,557,083 B1 | 4/2003 | Sperber et al. | |
| 6,594,755 B1 | 7/2003 | Nuechterlein et al. | |
| 6,604,187 B1 | 8/2003 | McGrath et al. | |
| 6,609,189 B1 | 8/2003 | Kuszmaul et al. | |
| 6,658,549 B2 | 12/2003 | Wilson et al. | |
| 6,681,395 B1 | 1/2004 | Nishi | |
| 6,907,600 B2 | 6/2005 | Neiger et al. | |
| 6,912,644 B1 | 6/2005 | O'Connor et al. | |
| 7,007,108 B2 | 2/2006 | Emerson et al. | |
| 7,111,145 B1 | 9/2006 | Chen et al. | |
| 7,143,273 B2 | 11/2006 | Miller et al. | |
| 7,149,872 B2 | 12/2006 | Rozas et al. | |
| 7,213,106 B1 | 5/2007 | Koster et al. | |
| 7,278,030 B1 | 10/2007 | Chen et al. | |
| 7,380,096 B1 | 5/2008 | Rozas et al. | |
| 7,406,581 B2 | 7/2008 | Southwell | |
| 7,546,420 B1 | 6/2009 | Shar et al. | |
| 7,680,988 B1 | 3/2010 | Nickolls et al. | |
| 7,783,868 B2 | 8/2010 | Ukai | |
| 7,856,530 B1 | 12/2010 | Mu | |
| 7,913,058 B2 | 3/2011 | Rozas et al. | |
| 8,145,844 B2 * | 3/2012 | Bruce | G06F 12/0817 |
| | | | 711/120 |
| 8,239,656 B2 | 8/2012 | Rozas et al. | |
| 8,301,847 B2 * | 10/2012 | Dantzig | G06F 12/0842 |
| | | | 711/118 |
| 8,522,253 B1 | 8/2013 | Rozas et al. | |
| 8,868,838 B1 | 10/2014 | Glasco et al. | |
| 8,930,674 B2 | 1/2015 | Avudaiyappan et al. | |
| 9,047,178 B2 | 6/2015 | Talagala et al. | |
| 2001/0049782 A1 | 12/2001 | Hsu et al. | |
| 2002/0069326 A1 | 6/2002 | Richardson et al. | |
| 2002/0082824 A1 | 6/2002 | Neiger et al. | |
| 2002/0099913 A1 | 7/2002 | Steely, Jr. | |
| 2003/0065887 A1 | 4/2003 | Maiyuran et al. | |
| 2003/0088752 A1 | 5/2003 | Harman | |
| 2004/0034762 A1 | 2/2004 | Kacevas | |
| 2004/0044850 A1 | 3/2004 | George et al. | |
| 2004/0064668 A1 | 4/2004 | Kjos et al. | |
| 2004/0093483 A1 | 5/2004 | Nguyen et al. | |
| 2004/0103251 A1 | 5/2004 | Alsup | |
| 2004/0117593 A1 | 6/2004 | Uhlig et al. | |
| 2004/0117594 A1 | 6/2004 | VanderSpek | |
| 2004/0143727 A1 | 7/2004 | McDonald | |
| 2004/0193857 A1 | 9/2004 | Miller et al. | |
| 2004/0205296 A1 | 10/2004 | Bearden | |
| 2004/0215886 A1 | 10/2004 | Cargnoni et al. | |
| 2004/0225872 A1 | 11/2004 | Bonanno et al. | |
| 2005/0005085 A1 | 1/2005 | Miyanaga | |
| 2005/0027961 A1 | 2/2005 | Zhang | |
| 2005/0060457 A1 | 3/2005 | Olukotun | |
| 2005/0108480 A1 | 5/2005 | Correale, Jr. et al. | |
| 2005/0154867 A1 | 7/2005 | DeWitt, Jr. et al. | |
| 2006/0004964 A1 | 1/2006 | Conti et al. | |
| 2006/0026381 A1 | 2/2006 | Doi et al. | |
| 2006/0190707 A1 | 8/2006 | McIlvaine et al. | |
| 2006/0236074 A1 | 10/2006 | Williamson et al. | |
| 2006/0277365 A1 | 12/2006 | Pong | |
| 2008/0077813 A1 | 3/2008 | Keller et al. | |
| 2008/0091880 A1 | 4/2008 | Vishin | |
| 2008/0126771 A1 | 5/2008 | Chen et al. | |
| 2008/0195844 A1 | 8/2008 | Shen et al. | |
| 2008/0215865 A1 | 9/2008 | Hino et al. | |
| 2008/0235500 A1 | 9/2008 | Davis et al. | |
| 2008/0270758 A1 | 10/2008 | Ozer et al. | |
| 2008/0270774 A1 | 10/2008 | Singh et al. | |
| 2008/0282037 A1 | 11/2008 | Kusachi et al. | |
| 2009/0138659 A1 | 5/2009 | Lauterbach | |
| 2009/0157980 A1 * | 6/2009 | Bruce | G06F 12/0817 |
| | | | 711/141 |
| 2009/0158017 A1 | 6/2009 | Mutlu et al. | |
| 2009/0164733 A1 | 6/2009 | Kim et al. | |
| 2009/0172344 A1 | 7/2009 | Grochowski et al. | |
| 2009/0287912 A1 | 11/2009 | Sendag | |
| 2010/0138607 A1 | 6/2010 | Hughes et al. | |
| 2010/0169578 A1 * | 7/2010 | Nychka | G06F 12/084 |
| | | | 711/138 |
| 2010/0169611 A1 | 7/2010 | Chou et al. | |
| 2010/0211746 A1 | 8/2010 | Tsukishiro | |
| 2011/0010521 A1 | 1/2011 | Wang et al. | |
| 2011/0082980 A1 | 4/2011 | Gschwind et al. | |

(56) References Cited

U.S. PATENT DOCUMENTS

| | | |
|---|---|---|
| 2011/0082983 A1 | 4/2011 | Koktan |
| 2011/0153955 A1 | 6/2011 | Herrenschmidt et al. |
| 2012/0005462 A1 | 1/2012 | Hall et al. |
| 2012/0042126 A1 | 2/2012 | Krick et al. |
| 2013/0019047 A1 | 1/2013 | Podvalny et al. |
| 2013/0046934 A1* | 2/2013 | Nychka ............... G06F 12/0897 711/119 |
| 2013/0086417 A1 | 4/2013 | Sivaramakrishnan et al. |
| 2013/0097369 A1 | 4/2013 | Talagala et al. |
| 2013/0238874 A1 | 9/2013 | Avudaiyappan et al. |
| 2013/0304991 A1 | 11/2013 | Bottcher et al. |
| 2013/0311759 A1 | 11/2013 | Abdallah |
| 2013/0346699 A1 | 12/2013 | Walker |
| 2014/0032844 A1 | 1/2014 | Avudaiyappan et al. |
| 2014/0032845 A1 | 1/2014 | Avudaiyappan et al. |
| 2014/0032856 A1 | 1/2014 | Avudaiyappan et al. |
| 2014/0075168 A1 | 3/2014 | Abdallah |
| 2014/0108730 A1 | 4/2014 | Avudaiyappan et al. |
| 2014/0156947 A1 | 6/2014 | Avudaiyappan et al. |
| 2014/0281242 A1 | 9/2014 | Abdallah et al. |
| 2016/0041908 A1 | 2/2016 | Avudaiyappan et al. |
| 2016/0041930 A1 | 2/2016 | Avudaiyappan et al. |

FOREIGN PATENT DOCUMENTS

| | | |
|---|---|---|
| EP | 0706133 | 4/1996 |
| GB | 2343270 A | 5/2000 |
| TW | 200707284 | 3/1995 |
| TW | 539996 B | 7/2003 |
| TW | 200401187 A | 1/2004 |
| TW | 591530 | 6/2004 |
| TW | I233545 B | 6/2005 |
| TW | I281121 B | 5/2007 |
| WO | WO0125921 | 4/2001 |

OTHER PUBLICATIONS

Cooperman, Gene; Cache Basics, 2003, http://www.ccs.neu.edu/course/com3200/parent/Notesicache-basics.html, pp. 1-3.
Final Office Action from U.S. Appl. No. 13/561,441, dated Oct. 14, 2016, 14 pages.
Final Office Action from U.S. Appl. No. 13/561,441, dated Sep. 26, 2014, 16 pages.
Final Office Action from U.S. Appl. No. 13/561,491, dated Jan. 14, 2015, 14 pages.
Final Office Action from U.S. Appl. No. 13/561,491, dated Nov. 12, 2014, 14 pages.
Final Office Action from U.S. Appl. No. 13/561,491, dated Oct. 13, 2015, 16 pages.
Final Office Action from U.S. Appl. No. 13/561,528, dated Nov. 10, 2014, 19 pages.
Final Office Action from U.S. Appl. No. 14/173,602, dated Jan. 8, 2016, 32 pages.
Final Office Action from U.S. Appl. No. 14/173,602, dated Jan. 9, 2017, 18 pages.
Final Office Action from U.S. Appl. No. 14/922,042, dated Oct. 14, 2016, 15 pages.
Final Office Action from U.S. Appl. No. 14/922,053, dated Oct. 14, 2016, 16 pages.
Garmany J., "The Power of Indexing," archived on Mar. 9, 2009, 7 pages.
International Preliminary Report on Patentability for Application No. PCT/US2013/051128, dated Feb. 12, 2015, 8 pages.
International Search Report and Written Opinion for Application No. PCT/US2013/051128, dated Oct. 30, 2013, 9 pages.
Jacobson et al., "Path-based Next Trace Prediction," IEEE, 1997, pp. 14-23.
Nanda Ax., et al., "The Misprediction Recovery Cache," International Journal of Parallel Programming, Plenum Publishing Corporation, 1998, vol. 26 (4), pp. 383-415.
Non-Final Office Action from U.S. Appl. No. 13/561,441, dated Dec. 22, 2014, 13 pages.
Non-Final Office Action from U.S. Appl. No. 13/561,441, dated Jan. 39, 2017, 17 pages.
Non-Final Office Action from U.S. Appl. No. 13/561,441, dated Jun. 4, 2014, 12 pages.
Non-Final Office Action from U.S. Appl. No. 13/561,441, dated May 17, 2016, 17 pages.
Non-Final Office Action from U.S. Appl. No. 13/561,491, dated Feb. 8, 2016, 16 pages.
Non-Final Office Action from U.S. Appl. No. 13/561,491, dated Jun. 16, 2014, 13 pages.
Non-Final Office Action from U.S. Appl. No. 13/561,491, dated May 5, 2015, 15 pages.
Non-Final Office Action from U.S. Appl. No. 13/561,528, dated Dec. 19, 2014, 13 pages.
Non-Final Office Action from U.S. Appl. No. 13/561,528, dated Jun. 17, 2014, 11 pages.
Non-Final Office Action from U.S. Appl. No. 14/173,602, dated Jul. 29, 2016, 19 pages.
Non-Final Office Action from U.S. Appl. No. 14/173,602, dated Sep. 8, 2015, 32 pages.
Non-Final Office Action from U.S. Appl. No. 14/922,042, dated Apr. 7, 2016, 16 pages.
Non-Final Office Action from U.S. Appl. No. 14/922,042, dated Dec. 14, 2016, 20 pages.
Non-Final Office Action from U.S. Appl. No. 14/922,053, dated Apr. 7, 2016, 15 pages.
Non-Final Office Action from U.S. Appl. No. 14/922,053, dated Dec. 15, 2016, 16 pages.
Notice of Allowance from U.S. Appl. No. 13/561,441, dated Feb. 2, 2016, 10 pages.
Notice of Allowance from U.S. Appl. No. 13/561,441, dated Jun. 23, 2015, 14 pages.
Notice of Allowance from U.S. Appl. No. 13/561,441, dated Mar. 18, 2015, 8 pages.
Notice of Allowance from U.S. Appl. No. 13/561,441, dated Oct. 21, 2015, 10 pages.
Notice of Allowance from U.S. Appl. No. 13/561,491, dated Dec. 19, 2016, 13 pages.
Notice of Allowance from U.S. Appl. No. 13/561,491, dated Jun. 8, 2016, 12 pages.
Notice of Allowance from U.S. Appl. No. 13/561,491, dated Sep. 14, 2016, 18 pages.
Notice of Allowance from U.S. Appl. No. 13/561,528, dated Aug. 3, 2016, 6 pages.
Notice of Allowance from U.S. Appl. No. 13/561,528, dated Feb. 8, 2016, 15 pages.
Notice of Allowance from U.S. Appl. No. 13/561,528, dated Jul. 13, 2015, 14 pages.
Notice of Allowance from U.S. Appl. No. 13/561,528, dated Mar. 31, 2015, 5 pages.
Notice of Allowance from U.S. Appl. No. 13/561,528, dated May 2, 2016, 10 pages.
Notice of Allowance from U.S. Appl. No. 13/561,528, dated Oct. 21, 2015, 9 pages.
Notice of Allowance from U.S. Appl. No. 13/561,570, dated Aug. 27, 2015, 9 pages.
Notice of Allowance from U.S. Appl. No. 13/561,570, dated Dec. 7, 2015, 7 pages.
Notice of Allowance from U.S. Appl. No. 13/561,570, dated Jan. 29, 2015, 9 pages.
Notice of Allowance from U.S. Appl. No. 13/561,570, dated Jun. 20, 2014, 8 pages.
Notice of Allowance from U.S. Appl. No. 13/561,570, dated May 20, 2015, 3 pages.
Notice of Allowance from U.S. Appl. No. 13/561,570, dated Oct. 22, 2014, 16 pages.
Rotenberg E., et al., "Trace Cache: a Low Latency Approach to High Bandwidth Instruction Fetching," Apr. 11, 1996, 48 pages.
Techopedia, Cache Memory Definition, www.techopedia.com/definition/6307/cache-memory.

(56) References Cited

OTHER PUBLICATIONS

Wallace S., et al.,"Multiple Branch and Block Prediction," Third International symposium on High-Performance Computer Architecture, IEEE, Feb. 1997, pp. 94-103.
Ye J., et al.,"A New Recovery Mechanism in Superscalar Microprocessors by Recovering Critical Misprediction,"IEICE Transactions on Fundamentals of Electronics, Communications and Computer Sciences, 2011, vol. E94-A (12), pp. 2639-2648.
Yeh T., et al.,"Increasing the Instruction Fetch Rate Via Multiple Branch Prediction and a Branch Address Cache," 7th International Conference on Supercomputing, ACM, 1993, pp. 67-76.

* cited by examiner

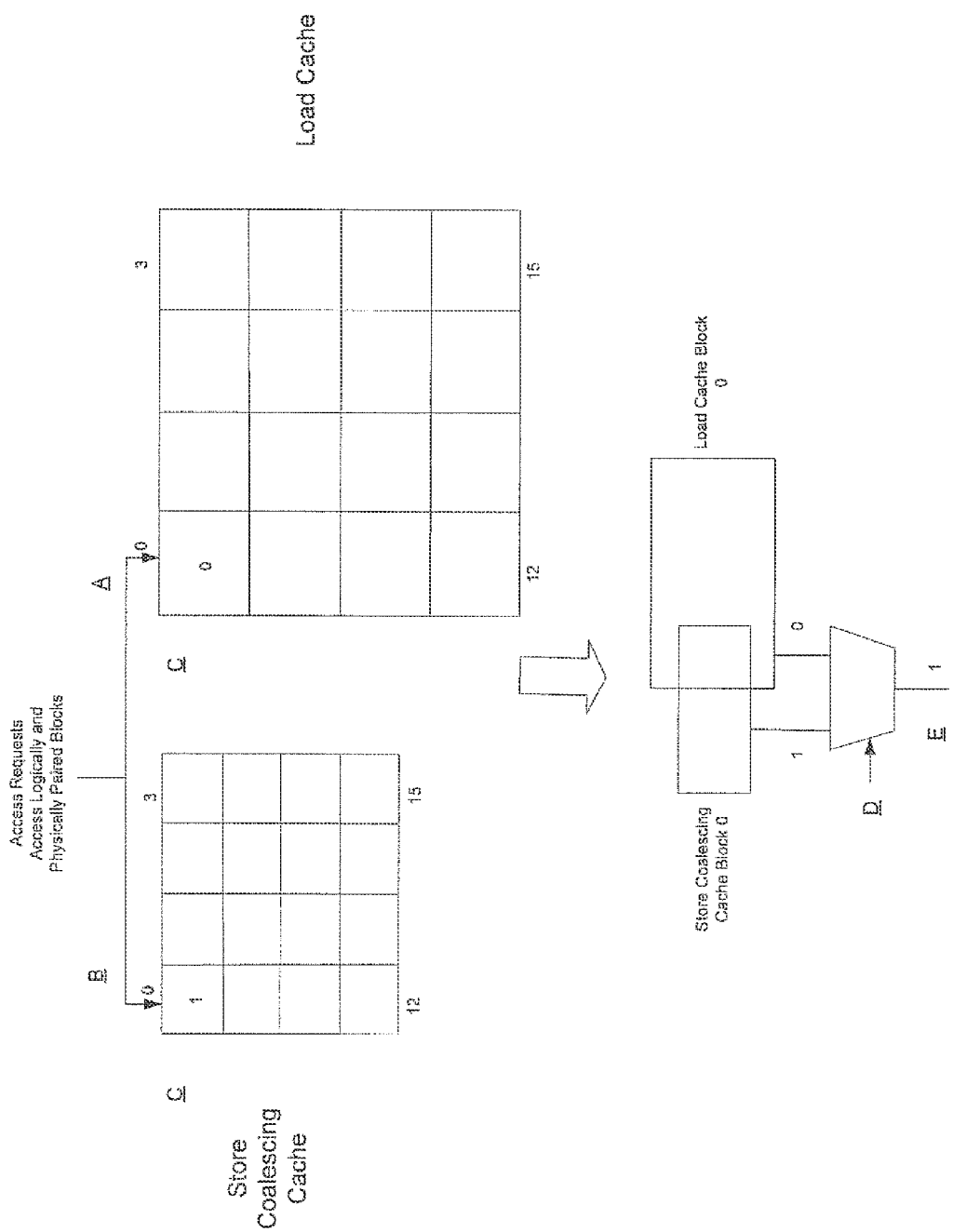

SYSTEMS AND METHODS FOR SUPPORTING A PLURALITY OF LOAD AND STORE ACCESSES OF A CACHE

RELATED U.S. APPLICATIONS

This application is a continuation of, claims the benefit of, and priority to the copending non-provisional patent application Ser. No. 13/561,570, entitled "SYSTEMS AND METHODS FOR SUPPORTING A PLURALITY OF LOAD AND STORE ACCESSES OF A CACHE," with filing date Jul. 30, 2012, and hereby incorporated by reference in its entirety.

BACKGROUND

A cache in a central processing unit is a data storage structure that is used by the central processing unit of a computer to reduce the average time that it takes to access memory. It is a memory which stores copies of data that is located in the most frequently used main memory locations. Moreover, cache memory is memory that is smaller and that may be accessed more quickly than main memory. There are several different types of caches. These include physically indexed physically tagged (PIPT), virtually indexed virtually tagged (VIVT) and virtually indexed physically tagged (VIPT).

Caches that can accommodate multiple accesses in a single cycle provide performance advantages. In particular, such caches feature reduced access latencies. Conventional approaches to accommodating multiple accesses in a single cycle include the use of multi-ported caches and the provision of caches that include a plurality of tag and data banks.

A multi-ported cache is a cache which can serve more than one request at a time. In accessing some conventional caches a single memory address is used, whereas in a multi-ported cache, N memory addresses can be requested at a time, where N is the number of ports that is possessed by the multi-ported cache. An advantage of a multi ported cache is that greater throughput (e.g., a greater number of load and store requests) may be accommodated. However, the number of cache ports that are needed to accommodate increasingly high levels of throughput may not be practical.

Caches that include a plurality of tag and data banks can serve more than one request at a time as each bank can serve at least one request. However, when more than one request attempts to access the same bank, the request that will be allowed to access the bank must be determined. In one conventional approach, serial arbitrations are used to determine which request will be allowed to access the data bank and to access the tag bank for the tag that corresponds to the request. However, the time that it takes to execute such arbitrations can delay access to the bank and thus delay the triggering of the critical Load Hit signal. Moreover, because a plurality of both loads and stores may need to be accommodated, the additional banks, ports and arbitration that may be needed can exact unsatisfactory latency penalties.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Conventional approaches to accommodating throughput that involves multiple accesses can result in unsatisfactory latency penalties as it relates to the timing of load hit signals. A method for supporting a plurality of load and store accesses of a cache is disclosed that addresses these shortcomings. However, the claimed embodiments are not limited to implementations that address any or all of the aforementioned shortcomings. As a part of the aforementioned method, responsive to a request of a plurality of requests to access a block of a plurality of blocks of a load cache, the block of the load cache and a logically and physically paired block of a store coalescing cache are accessed in parallel. The data that is accessed from the block of the load cache is overwritten by the data that is accessed from the block of the store coalescing cache by merging on a per byte basis. Thereafter, access is provided to the merged data. Because the data is merged locally and block access arbitrations involving a plurality of access requests to the load cache and the store coalescing cache are executed in parallel with the identification of associated tags, a plurality of loads and stores are provided quick access to the data maintained by the load cache and the store coalescing cache.

BRIEF DESCRIPTION OF THE DRAWINGS

The invention, together with further advantages thereof, may best be understood by reference to the following description taken in conjunction with the accompanying drawings in which:

FIG. 1E illustrate operations performed by system for supporting a plurality of load and store accesses of a cache in a single cycle based on an organization of load and store coalescing caches according to one embodiment.

It should be noted that like reference numbers refer to like elements in the figures.

DETAILED DESCRIPTION

Figure 1A:
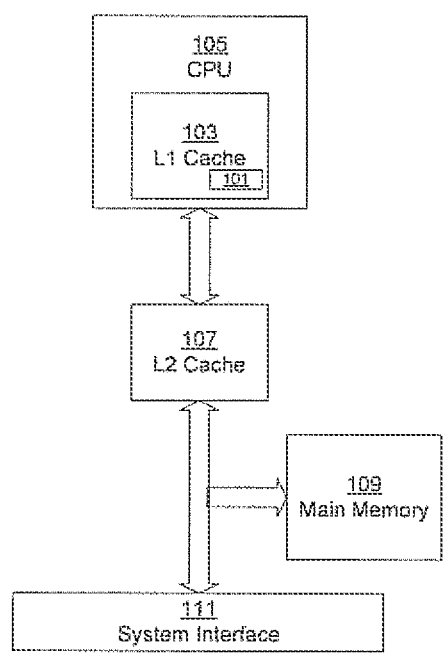
FIG. 1A shows an exemplary operating environment of a system for supporting a plurality of load and store accesses of a cache in a single cycle based on an organization of load and store coalescing caches according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "comparing" or "merging" or "providing access" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Exemplary Operating Environment of a System for Supporting a Plurality of Load and Store Accesses of a Cache According to One Embodiment FIG. 1A shows an exemplary operating environment of a system 101 for supporting a plurality of load and store accesses of a cache in a single cycle based on an organization of load and store coalescing caches according to one embodiment. System 101 directs, in response to each request of a plurality of requests to access a load cache, parallel accesses of the load cache and a store coalescing cache and a local comparing of their accessed content in a single cycle. Moreover, as a part of the operation of system 101, block access arbitrations involving a plurality of access requests to the load cache and the store coalescing cache are executed in parallel with the identification of associated tags. Consequently, a plurality of loads and stores are provided quicker access to data maintained by the load cache and the store coalescing cache. FIG. 1A shows system 101, level one (L1) cache 103, level two (L2) cache 107, CPU 105, main memory 109 and system interface 111.

Figure 1B:
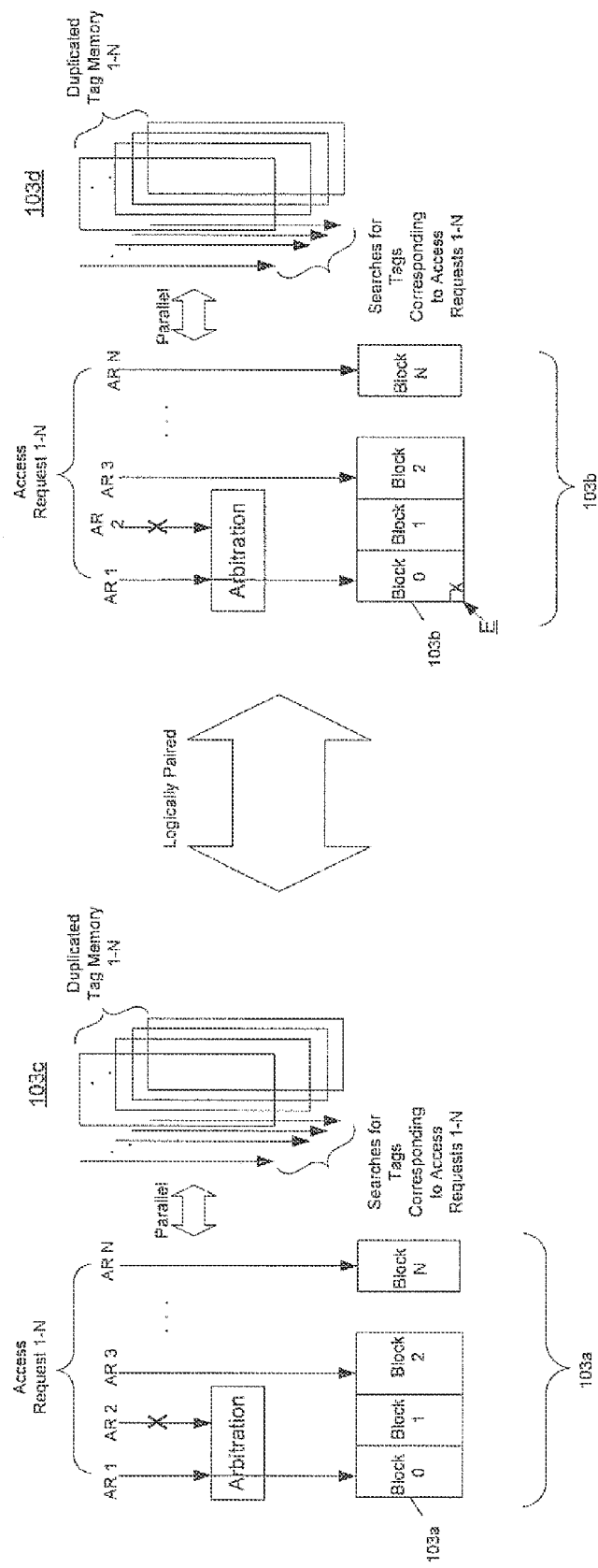
FIG. 1B shows a diagram that illustrates the manner in which a plurality of data blocks facilitate the accessing of a load cache and a store coalescing cache by multiple requests in the same clock cycle according to one embodiment.

Referring to FIG. 1A, L1 cache 103 is a level 1 cache and L2 cache 107 is a level 2 cache. In one embodiment, as shown in FIG. 1B, L1 cache 103 can include store coalescing cache 103a, load cache 103b, store coalescing cache tag memory 103c (e.g., SRAM or other type memory) and load cache tag memory 103d (e.g., SRAM or other type memory). In other embodiments, L1 cache 103 can include other components. As shown in FIG. 1B, load cache 103b can be divided into a plurality of data blocks. In one embodiment, load cache 103b can be divided into four 8 kilobyte data blocks. In other embodiments, load cache 103b can be divided into other numbers of data blocks that have the capacity to store other amounts of data. In one embodiment, store coalescing cache 103a, although smaller in size than load cache 103b, is organized similarly to load cache 103b. In one embodiment, as shown in FIG. 1B, the plurality of data blocks that are possessed by these caches facilitates the accessing of load cache 103b and store coalescing cache 103a by a throughput of multiple requests, 1-N, in the same clock cycle.

Referring to FIG. 1B, in one embodiment, as a part of the aforementioned configuration, store coalescing cache tag memory 103c and load cache tag memory 103d maintain a plurality of copies, 1-N, of the tags that correspond to cache line entries of store coalescing cache 103a and load cache 103b respectively. Accordingly, a dedicated tag memory copy for each access request 1-N is provided that facilitates the identification of tags that correspond to the requests and to the cache line entries within a single clock cycle. In one embodiment, arbitrations related to block accesses are executed in parallel with the identification of tags associated with the cache line entries (see FIG. 1B).

Figure 1C:
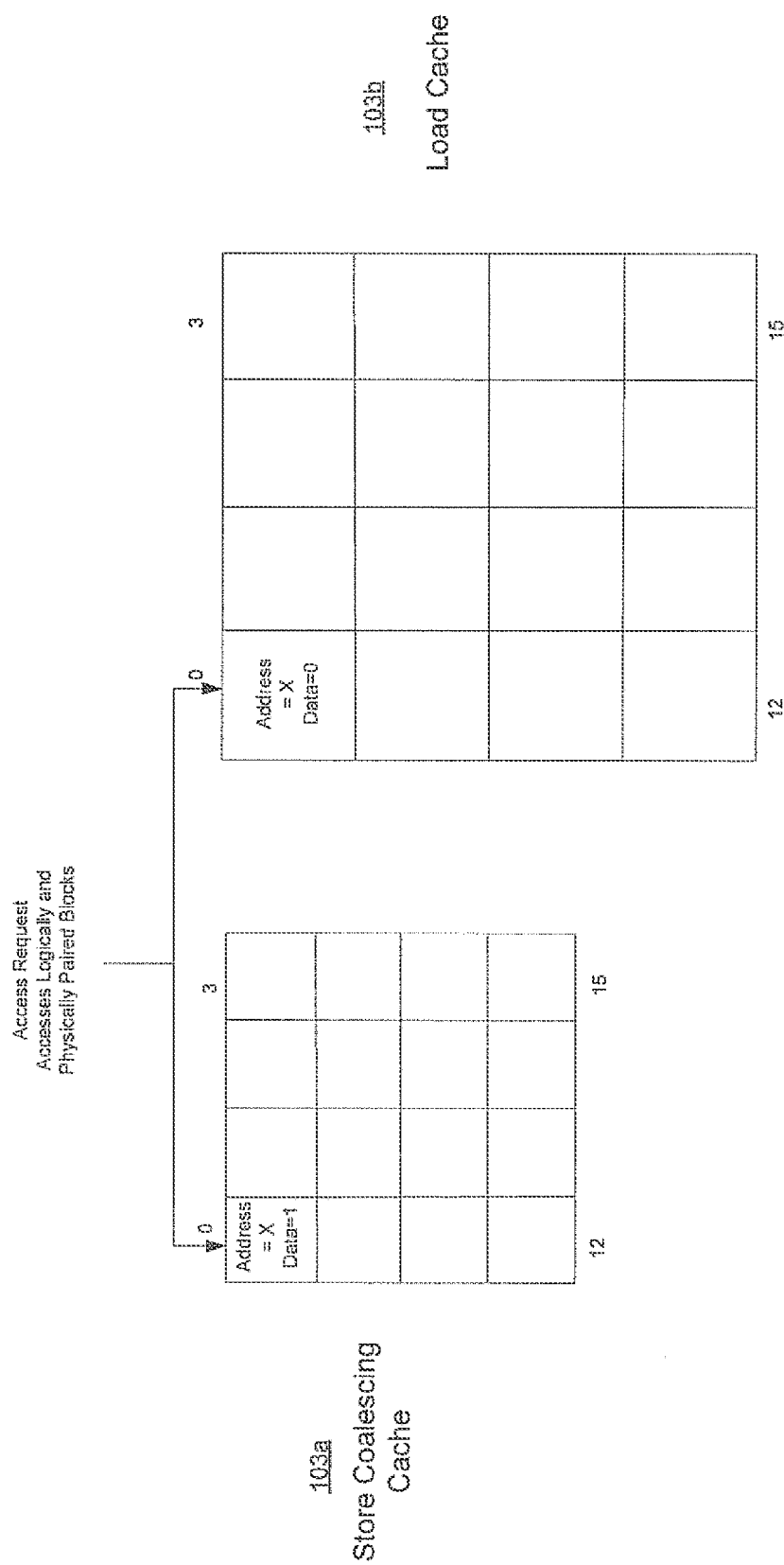
FIG. 1C shows a store coalescing cache and a load cache that are organized such that related entries are maintained in blocks of the respective caches that are positioned similarly within the caches according to one embodiment.

In one embodiment, store coalescing cache 103a and load cache 103b are organized such that related entries are maintained in blocks of the respective caches that are positioned similarly within the caches as is shown in FIG. 1C. Moreover, the blocks are logically and physically paired such that an access request to a block in load cache 103b results in an access request to the logically and physically paired block in store coalescing cache 103a (and a corresponding search of both store coalescing cache tag memory 103c and load cache tag memory 103d for the tags that correspond to the requests). Consequently, arbitrations related to block access as well as operations relating to the identification of tags corresponding to the requests are merged with regard to store coalescing cache 103a and load cache 103b.

Figure 1D:
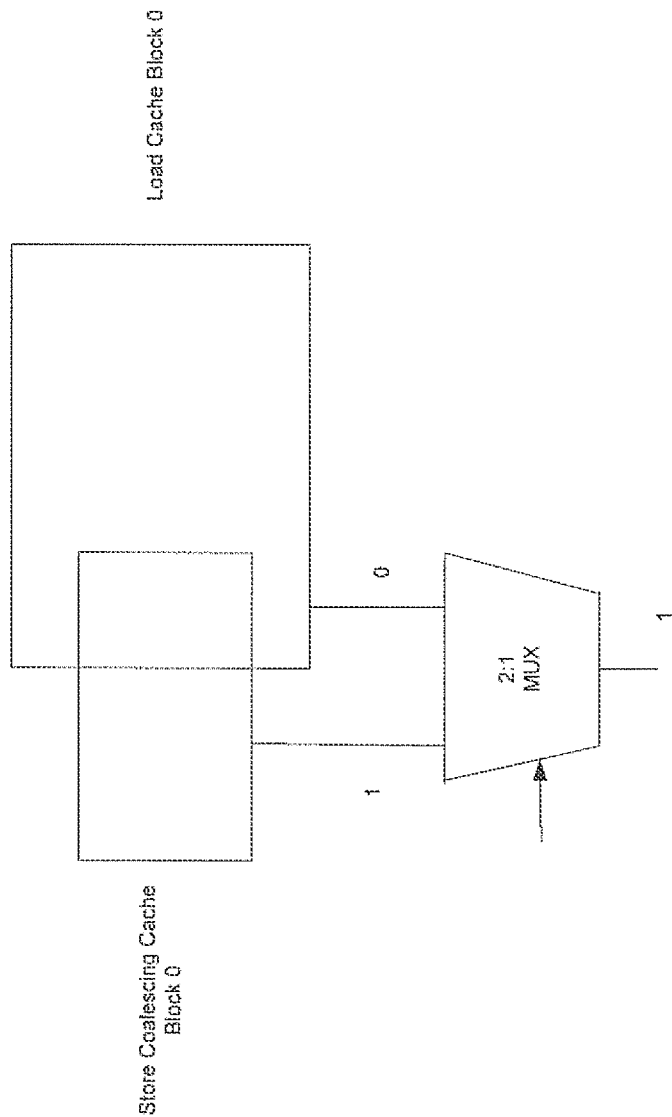
FIG. 1D shows blocks of a store coalescing cache and a load cache that provide data to a multiplexor as a part of merger operations according to one embodiment.

In one embodiment, the data maintained in store coalescing cache 103a is considered to be more up to date (e.g., is considered to be the latest version) than the data that is maintained in the logically and physically paired load cache 103b. Accordingly, the data that is maintained in store coalescing cache 103a is given priority over data that is maintained in load cache 103b in merge operations involving such data. This is shown in FIG. 1D where the input into a 2:1 multiplexor from a store coalescing cache block (store coalescing cache block 0) is given priority over an input from a load cache block (load cache block 0). The prioritization of the store coalescing cache contents over the load cache contents ensures the provision of the latest data to access requestors.

Referring again to FIG. 1A, system 101, responsive to a request to access load cache 103b, directs accesses of store coalescing cache 103a and load cache 103b in parallel. Thereafter, the data that is accessed from store coalescing cache 103a and the data that is accessed from load cache 103b is merged. The merged data is then made available to the access requestor. In one embodiment, the data can be merged using a 2:1 multiplexer as discussed above. In other embodiments, other manners of merging the data can be used. In one embodiment, as a part of the merger of the data, as discussed above, the data that is stored in store coalescing cache 103a is given priority over the data that is stored in load cache 103b.

In one embodiment, system 101, is able to facilitate the execution of a plurality of loads and stores in a single cycle based on the organization of load cache 103b and store coalescing cache 103a. In one embodiment, the parallelism facilitated by system 101 operates to provide quicker load and store accesses. In one embodiment, system 101 can be located in a cache controller (not shown). In other embodiments, system 101 can be separate from a cache controller, but operate cooperatively therewith.

Main memory 111 includes physical addresses that store the information that is copied into cache memory. In one embodiment, when the information that is contained in the physical addresses of main memory that have been cached is changed, the corresponding cached information is updated to reflect the changes made to the information stored in main memory. Also shown in FIG. 1A is system interface 111.

Operation

FIG. 1E illustrates operations performed by system 101 for supporting a plurality of load and store accesses of a cache in a single cycle based on an organization of load and store coalescing caches according to one embodiment. These operations, which relate to supporting a plurality of loads and stores in a single cycle, are only exemplary. It should be appreciated that other operations not illustrated by FIG. 1E can be performed in accordance with one embodiment.

Referring to FIG. 1E, at A, a load request involving a specific block of a level one load cache is received.

At B, the block of the store coalescing cache that logically and physically corresponds to the specific block of the level one load cache is simultaneously identified. In one embodiment, because both the load cache and the store coalescing cache are similarly organized, the bits of the virtual address associated with the request that addresses the aforementioned specific block of the load cache, simultaneously addresses the similarly situated, logically and physically paired, block of the store coalescing cache.

At C, a read enable that corresponds to the block of the store coalescing cache and a read enable that corresponds to the block of the load cache are asserted in parallel (because arbitration for both blocks are the same) and data from each of the blocks is accessed.

At D, the data accessed from the accessed block of the store coalescing cache and the data accessed from the accessed block of the load cache is locally compared.

At E, the data accessed from the accessed block of the store coalescing cache and the data accessed from the accessed block of the load cache is merged. And, the merged data is made available to the load requestor.

In exemplary embodiments stores can access the store coalescing cache without a corresponding access of the load cache. However, as discussed herein, load requests trigger a parallel access of both the load cache and the store coalescing cache. Exemplary embodiments accommodate a throughput of many loads and stores, do not penalize the timing of the "load hit" signal and maintain consistency between loads and stores.

Figure 2:
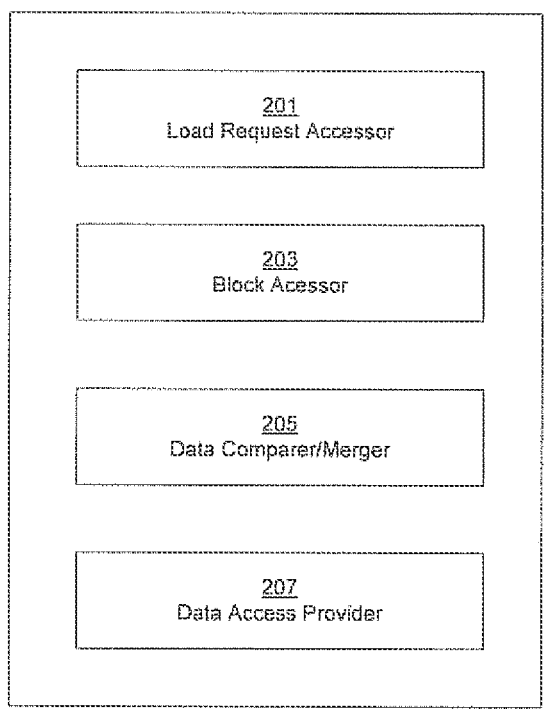
FIG. 2 shows components of a system for supporting a plurality of load and store accesses of a cache in a single cycle according to one embodiment.

Components of System for Supporting a Plurality of Load and Store Accesses of a Cache According to One Embodiment FIG. 2 shows components of a system 101 for supporting a plurality of load and store accesses of a cache in a single clock cycle based on an organization of load and store coalescing caches according to one embodiment. In one embodiment, components of system 101 implement an algorithm for supporting a plurality of load and store accesses in a single clock cycle. In the FIG. 3 embodiment, components of system 101 include load request accessor 201, block accessor 201, data comparer/merger 203 and data access provider 205.

Load request accessor 201 accesses requests to access blocks of a load cache (e.g., load cache 103b in FIG. 1B) and/or a store coalescing cache (e.g., store coalescing cache 103a in FIG. 1B). In one embodiment, the requests can include a plurality of load and store requests.

Block accessor 203, responsive to a request of a plurality of requests to access a block of a plurality of blocks in a load cache (e.g., 103b in FIG. 1B), accesses the block in the load cache and a logically and physically paired block in a store coalescing cache (e.g., 103a in FIG. 1B) in parallel. In one embodiment, the block in the load cache and the block in the store coalescing cache are logically paired and are situated similarly within the organizational structure of the respective caches.

Data comparer/merger 205 compares and merges data accessed from the accessed block of the load cache to data that is accessed from the accessed block of the store coalescing cache on a per byte basis. In one embodiment, the data that is maintained in the store coalescing cache is given priority over the data that is maintained in the load cache. As such, data that is inconsistent with that which is supplied by the store coalescing cache is replaced by the data supplied from the store coalescing cache. In one embodiment, data comparer/merger 203 can be implemented using a multiplexer that compares and merges the data supplied by the store coalescing cache and the data supplied by the load cache. In one embodiment, the multiplexer can be a 2:1 multiplexer. In one embodiment, the comparison is locally performed (carried out inside the level one data cache).

Data access provider 207 provides access to the merged data to the load requestor. In one embodiment, the herein described processes ensure that the data provided can be a part of a throughput of many loads and stores, is provided in a manner that does not penalize the timing of the "load hit" signal and maintains consistency between loads and stores.

It should be appreciated that the aforementioned components of system 101 can be implemented in hardware or software or in a combination of both. In one embodiment, components and operations of system 101 can be encompassed by components and operations of one or more computer components or programs (e.g., a cache controller). In another embodiment, components and operations of system 101 can be separate from the aforementioned one or more computer components or programs but can operate cooperatively with components and operations thereof.

Figure 3:
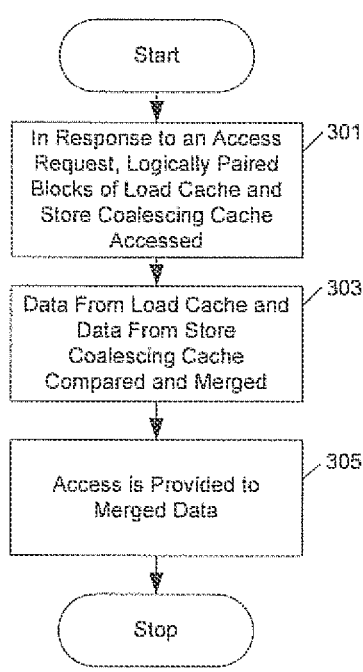
FIG. 3 shows a flowchart of the steps performed in a method for supporting a plurality of load and store accesses of a cache in a single cycle according to one embodiment.

Method for Supporting a Plurality of Load and Store Accesses of a Cache According to One Embodiment FIG. 3 shows a flowchart 300 of the steps performed in a method for supporting a plurality of loads and stores in a single clock cycle based on an organization of load and store coalescing caches according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart. Although specific steps are disclosed in the flowcharts, such steps are exemplary. That is the present embodiments are well suited to performing various other steps or variations of the steps recited in the flowcharts.

Referring to FIG. 3, at 301, responsive to a request of a plurality of requests to access a block of a plurality of blocks of a load cache, the block of the load cache and a logically and physically paired block of a store coalescing cache are accessed in parallel. In one embodiment, the block of the load cache and the block of the store coalescing cache are logically and physically paired and are a part of similarly organized caches that facilitate their access in a single clock cycle.

At 303, data accessed from the block of the load cache is compared and merged with data that is accessed from the block of the store coalescing cache on a per byte basis. In one embodiment, as a part of the data comparison and merger process, the data that is maintained in the block of the store coalescing cache is given priority over the data that is maintained in the block of the load cache. Consequently, where the data in the block of the load cache and the data in the block of the store coalescing cache are different, the data from the block of the store coalescing cache is included in the merged data result.

At 305, access to the result of the data merger is provided to access requestors. In one embodiment, operations described herein ensure that access to the latest version of data that is associated with an address is provided to the requestor.

With regard to exemplary embodiments thereof, systems and methods for supporting a plurality of load and store accesses of a cache are disclosed. Responsive to a request of a plurality of requests to access a block of a plurality of blocks of a load cache, the block of the load cache and a logically paired block of the store coalescing cache are accessed in parallel. The data that is accessed from the block of the load cache is compared to the data that is accessed from the block of the store coalescing cache and merged on a per byte basis. Access is provided to the merged data.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for processing a cache access request, the method comprising:
   receiving a request to access a data block of a plurality of data blocks of a load cache;
   accessing the data block of the load cache and an associated data block of a store coalescing cache in parallel;
   comparing data accessed from the data block of the load cache to data accessed from the data block of the store coalescing cache and merging the data; and
   sending the merged data.

2. The method of claim 1, wherein the data block of the load cache and the associated data block of the store coalescing cache are logically paired.

3. The method of claim 1, wherein the data block of the load cache and the associated data block of the store coalescing cache are physically paired.

4. The method of claim 1, wherein the merging is performed on a per byte basis.

5. The method of claim 1, wherein the comparing and the merging are performed locally within a cache that comprises the load cache and the store coalescing cache.

6. The method of claim 1, wherein the data block of the load cache and the associated data block of the store coalescing cache are situated similarly within organizational structures of the load cache and the store coalescing cache respectively.

7. The method of claim 1, wherein the merging prioritizes data from the store coalescing cache over data from the load cache.

8. The method of claim 1, wherein access arbitrations related to the data block, and searches for a tag corresponding to the request to access the data block, are merged with respect to the load cache and the store coalescing cache.

9. The method of claim 1, wherein a plurality of requests to access a same block of the plurality of blocks causes an access arbitration that is executed in parallel with accessing of a tag memory for tags corresponding to each request of the plurality of requests.

10. A cache apparatus comprising:
    a cache comprising:
      a store coalescing cache;
      a load cache; and
      a cache controller comprising:
        a location accessing component responsive to a request to access a data block of the load cache and configured for accessing the data block of the load cache and an associated data block of the store coalescing cache in parallel;
        a comparing and merging component configured for comparing data from the data block of the load cache to data of the associated data block of the store coalescing cache and merging the data; and
        an access component for facilitating access to the merged data.

11. The cache apparatus of claim 10, wherein the data block of the load cache and the associated data block of the store coalescing cache are logically paired.

12. The cache apparatus of claim 10, wherein the data block of the load cache and the associated data block of the store coalescing cache are physically paired.

13. The cache apparatus of claim 10, wherein the merging is performed on a per byte basis.

14. The cache system of claim 10, wherein the comparing and the merging are performed locally within the cache.

15. The cache system of claim 10, wherein the data block of the load cache and the associated data block of the store coalescing cache are situated similarly within organizational structures of the load cache and the store coalescing cache respectively.

16. The cache system of claim 10, wherein in the merging, data from the store coalescing cache is given priority over data from the load cache.

17. The cache system of claim 10, wherein a plurality of requests to access a same block of a plurality of blocks of the load cache causes an access arbitration that is executed in parallel with an accessing of a tag storage memory for tags corresponding to each of the plurality of requests.

18. A processor, comprising:
　a cache system, comprising:
　　a level one cache system; and
　　a level two cache system;
　the level one cache system comprising:
　　a store coalescing cache;
　　a load cache; and
　　a cache controller configured for accessing a data block of the load cache and an associated data block of the store coalescing cache in parallel and merging data from the data block of the load cache and an associated data block of the store coalescing cache.

\* \* \* \* \*